Figure 1:
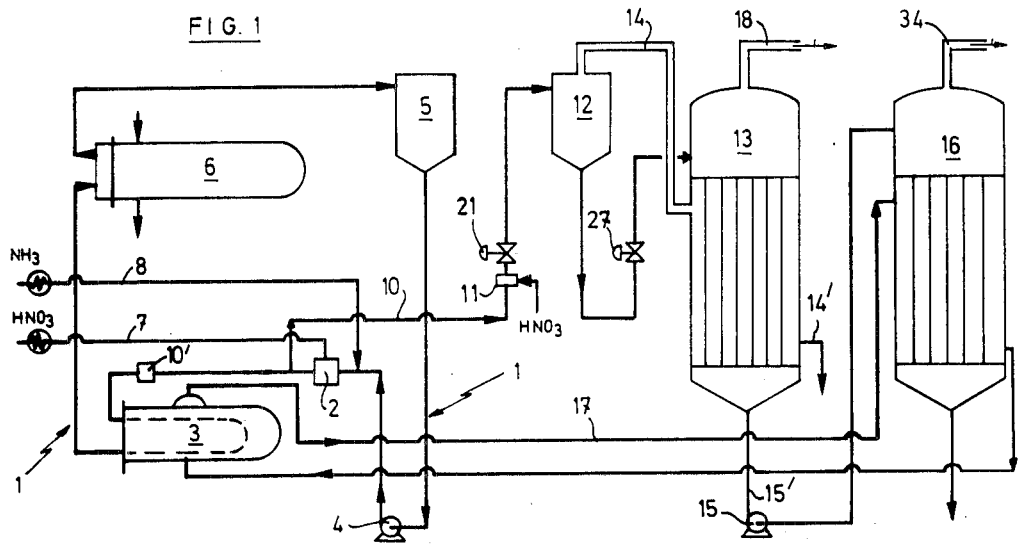

United States Patent [19]

Pouilliart et al.

[11] Patent Number: 4,645,656

[45] Date of Patent: Feb. 24, 1987

[54] PROCESS AND APPARATUS FOR THE PRODUCTION OF AMMONIUM NITRATE

[76] Inventors: Roger V. Pouilliart, Avenue de la Réforme, 32, 1080 Brussels; Francis C. Van Hecke, Avenue de Tervuren, 183, 1040 Brussels, both of Belgium

[21] Appl. No.: 575,944

[22] Filed: Feb. 1, 1984

[30] Foreign Application Priority Data

Feb. 8, 1983 [LU] Luxembourg ............................ 84636

[51] Int. Cl.⁴ .............................................. C06B 1/04
[52] U.S. Cl. ..................................... 423/396; 422/235
[58] Field of Search ......................... 423/396; 422/235

[56] References Cited

U.S. PATENT DOCUMENTS

| 2,089,945 | 8/1937 | Converse et al. | 423/396 |
| 2,551,569 | 5/1951 | Strelzoff | 423/396 |
| 3,285,695 | 11/1966 | Cook et al. | 423/396 |

FOREIGN PATENT DOCUMENTS

| 614324 | 6/1935 | Fed. Rep. of Germany . |
| 716595 | 12/1931 | France . |
| 715917 | 12/1931 | France . |
| 730380 | 8/1932 | France . |
| 1028427 | 5/1953 | France . |
| 1356054 | 12/1964 | France . |
| 2096124 | 10/1982 | United Kingdom . |

Primary Examiner—John Doll
Assistant Examiner—Wayne A. Langel
Attorney, Agent, or Firm—Birch, Stewart, Kolasch & Birch

[57] ABSTRACT

This invention relates to a process and an apparatus for the production of ammonium nitrate which produce an ammonium nitrate solution of a sufficient concentration, preferably from 90 to 98% by weight using nitric acid solutions of a relatively low concentration. The ammonium nitrate solution is concentrated in a multistage evaporation installation in which at least one evaporator is heated by the steam generated by a depressurization of the ammonium nitrate solution.

9 Claims, 4 Drawing Figures

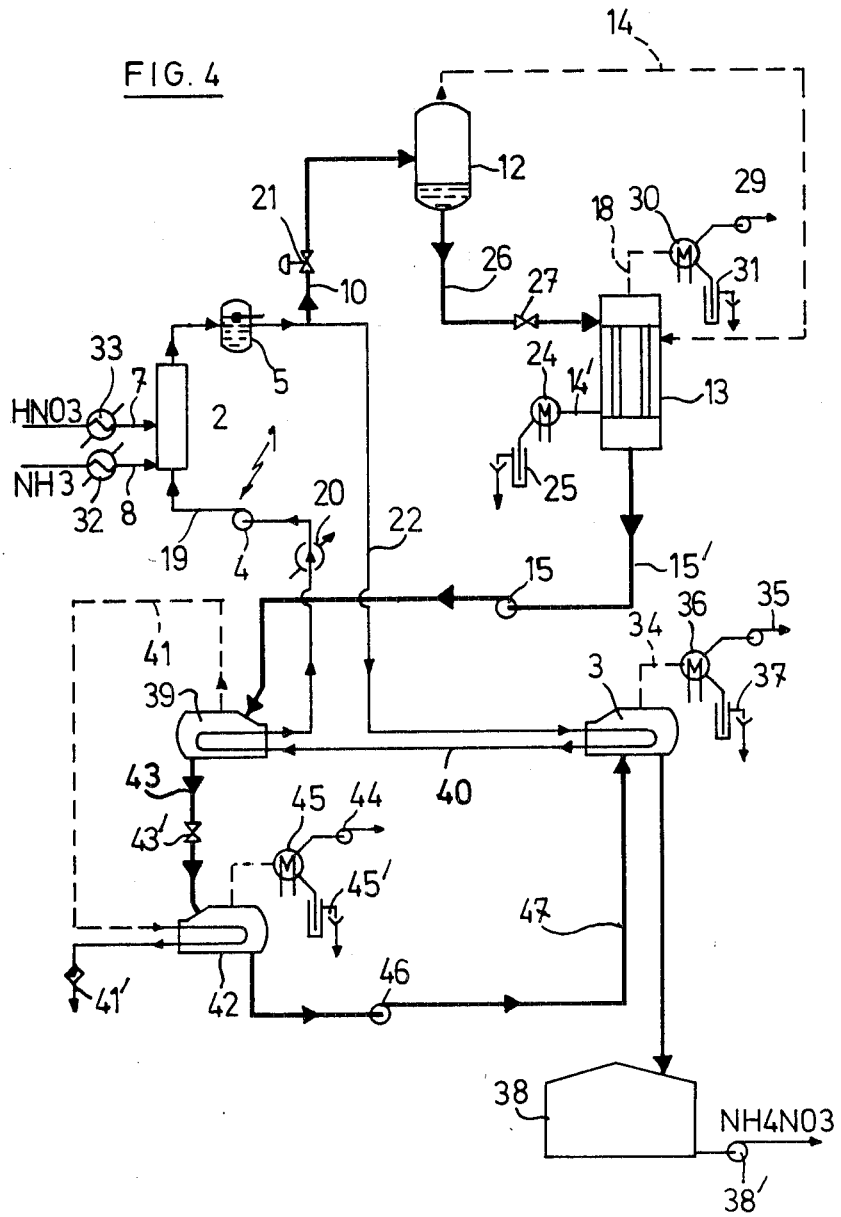

PROCESS AND APPARATUS FOR THE PRODUCTION OF AMMONIUM NITRATE

This invention relates to a process and an apparatus for the production of concentrated solutions of ammonium nitrate by the neutralization of nitric acid using ammonia in an aqueous solution which is maintained under a pressure greater than atmospheric pressure, and by the concentration of the aqueous solution of ammonium nitrate which is obtained by evaporation, using at least some of the heat released by the neutralization reaction to concentrate the ammonium nitrate solution.

This invention relates in particular to an autothermic process which is capable of providing an ammonium nitrate solution having a sufficient concentration, while using nitric acid solutions of a relatively low concentration.

Most of the industrial production of ammonium nitrate is intended for the manufacture of nitrogeneous or complex agricultural fertilizers. For the manufacture of these fertilizers, ammonium nitrate is preferably used in the form of a hot concentrated solution, the concentration of which is more than 90% by weight. In general, ammonium nitrate solutions of either from 94 to 95% by weight, or from 97 to 98% by weight are used.

Ammonia is generally available as an anhydrous liquid. It is preferably used as an anhydrous gas after the cooling potential has been used which is associated with the vaporization process of liquid ammonia.

Industrial nitric acid which is produced by the combustion of ammonia is usually available in a concentration of 56 to 60% by weight.

In some recent industrial production processes, it has been possible to obtain a fraction of the output in the form of acid having a concentration of 65 to 67% by weight, but ecological and economic restraints confine this fraction to about a quarter of the unit production, while the main flow of production attains a concentration of about 60% by weight of nitric acid.

Another source of nitric acid is provided by installations for washing residual nitrous gases in different chemical production processes which produce nitric acid diluted to a concentration of about 40% by weight.

The neutralization reaction of nitric acid by ammonia is exothermic. Under normal industrial conditions, the heat which is available contains about 104 megajoules/Kmol, while the starting nitric acid has a concentration of from 54 to 60% by weight.

Synthesis processes are known, according to which the neutralization reaction is carried out in a reaction tank in a considerable mass of ammonium nitrate solution which is then brought to a final concentration of from 94 to 95% by weight, without having recourse to an external supply of calories. In these known processes, the heat which is released by the neutralization reaction is removed as process steam by the evaporation of some of the water which has been produced by the reagents. The greater the steam production of the process, the higher the concentration of the ammonium nitrate solution which has formed in the reaction tank.

In order to recover the heat of the reaction at a relatively high temperature level, in known processes the reaction is carried out under an absolute pressure of about 4 bars.

As described in, for example U.S. Pat. No. 2,551,569, the process steam which is released during the reaction is reused as a heating fluid in order to bring the ammonium nitrate solution which is drawn off from the reactor to the final concentration. The higher the operating temperature of the reaction tank, the greater the quantities of ammonium nitrate, ammonia and nitric acid which are contained in this process steam. The main consequence of this is that the apparatus in which this steam is reused must consist of special alloys which are resistant to corrosion. Moreover, the condensates which are formed by this process steam cannot be flushed away without being previously treated in order to remove most of the ammonium and nitrate ions therefrom.

British Patent Application, published under No. 2,096,124, describes a process for the production of ammonium nitrate which uses the heat generated by the neutralization reaction itself for the concentration by evaporation of the ammonium nitrate solution. In this known process, a main flow of the ammonium nitrate solution which has been drawn off from the reactor is depressurized to a vaporization pressure, the resulting solution being reheated and concentrated by evaporation by means of a secondary flow of the ammonium nitrate solution.

This process which may be carried out in several stages provides that the main flow be reheated as early as the first depressurization and during each of the successive stages by the secondary flow which is drawn off from the reactor.

In none of the known processes does the total yield of energy make it possible, for example to bring the ammonium nitrate solution to a sufficiently high final concentration, i.e., a concentration greater than 95%, if the latter has resulted from conventional nitric acid having a concentration of about 55 to 56% by weight.

An object of the present invention is to improve the energy yield of the known processes for the synthesis of ammonium nitrate, in particular the energy yield of those processes which are carried out without the production of the process steam. The present invention provides a process and an apparatus for the production of ammonium nitrate which make it possible to obtain a final concentration of the ammonium nitrate solution of more than 95%, even while using dilute nitric acid.

The process according to the present invention is essentially characterized in that the ammonium nitrate solution is concentrated after having been drawn off from the reaction zone, in a multistage evaporation installation in which at least a first evaporator is heated by the steam generated by a depressurization of the ammonium nitrate solution, while the evaporator which brings the mixture to the final concentration is heated by means of the calories which are available in the reaction zone.

In a first particular embodiment of the present process, at least some of the recirculating solution is used as heating fluid to heat the above-mentioned evaporator which brings the mixture to its final concentration.

According to one characteristic of the present invention, the neutralization reaction is carried out in the presence of a slight excess of ammonia which is then neutralized with a complement of nitric acid in the solution which is drawn off from the reaction zone just before the first depressurization step.

In a particular embodiment, the solution which is recirculating in the reaction zone is used as a heating fluid in a heat exchanger to produce the low pressure steam, while the solution which is drawn off from the reaction zone is concentrated in a multiple effect installation under a decreasing pressure, and the evaporator bringing the mixture to the final concentration uses at least some of the steam which is produced in the heat exchanger of the reaction zone.

The neutralization reaction advantageously takes place in the reaction zone under an absolute pressure of from 3 to 10 bars.

This invention also relates to an installation for the production of ammonium nitrate which uses the above-described process.

In a particular embodiment, the reaction zone consists of a reaction loop essentially comprising a reactor which may be tubular, at least one indirect exchanger, the function of which is to remove the heat generated by the reaction and consequently to stabilize the temperature, and a recirculation pump.

Other characteristics and details of the present invention will be revealed by reading the following description of the drawings and embodiments of this invention which are provided purely by way of illustration.

Figure 2:
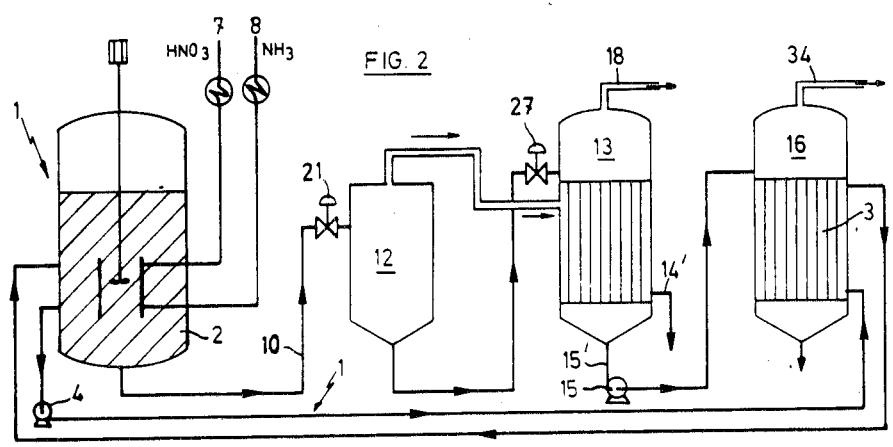
Figure 3:
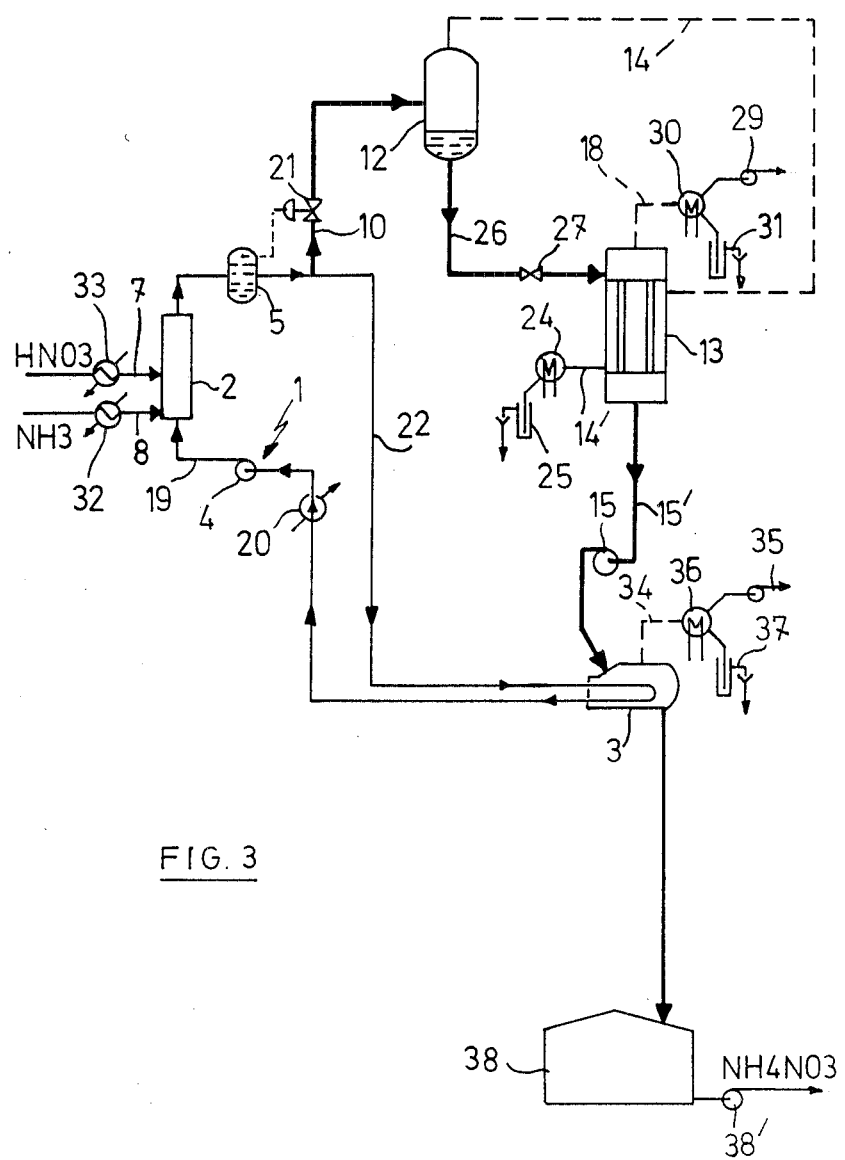

FIG. 1 schematically shows an installation for the production of ammonium nitrate comprising a reaction loop and using the process according to the present invention;

FIG. 2 schematically shows an installation which uses the process according to the present invention and which comprises a reaction tank with internal circulation;

FIG. 3 schematically shows a production installation in which the reaction loop comprises a reboiler; and FIG. 4 illustrates a production installation with a double-acting evaporator.

The operating principle of the present process is described as a function of an installation which is shown in diagram form in FIG. 1 and which operates in two depressurization stages using nitric acid having a conventional concentration of 54%.

The ammonium nitrate is obtained by neutralizing nitric acid using gaseous ammonia and/or possibly aqueous ammonia in an aqueous solution which is maintained under a pressure greater than the vapour pressure of the solution, and concentrating the aqueous solution of ammonium nitrate which is obtained, by evaporation.

As shown in FIG. 1, the reaction zone consists of a reaction loop which is designated as a whole by reference numeral 1, and it essentially comprises a tubular reactor or static mixer 2, a heat exchanger 3, a recirculation pump 4 and an expansion vessel 5. A second heat exchanger 6 which is heated by means of steam under a pressure of 5 bars is used only for starting up the installation.

The reagents consisting of nitric acid 7 having a concentration of about 54%, and of gaseous ammonia 8 are introduced into the reaction loop 1 by means of a static mixer 2, while some of the reaction mixture is recycled.

The operating pressure is adjusted to about 4.6 bars in order to avoid vaporization. The solution of ammonium nitrate which is drawn off from the reaction loop 1 then contains all the water which was provided by the reagents.

The recycling rate which is essential for conventional concentrations of acids is adjusted in order to restrict the increase in temperature due to the reaction, for example to about 10° C. The heat of the reaction is removed by means of a heat exchanger 3 by a heating fluid which transfers it to the stage of the final concentration 16 of the solution to 95%.

A line 10 for continuously drawing off hot dilute solution containing all of the reagents ensures the operating equilibrium of the reaction loop 1.

Since no vaporization takes place in the reaction loop 1, the control of the degree of acidity (pH) may be adjusted at 10' in order to avoid the presence of free nitric acid. In this way, risks of corrosion are minimized.

Before the solution 10 is concentrated by evaporation in a multiple action installation, the degree of acidity is advantageously regulated at a point 11 in order to remove the presence of free ammonia in order to reduce the losses of this reagent by volatilization.

This hot solution is then subjected to an adiabatic depressurization in a separator 12 to an intermediate pressure of about 1 bar. The adiabatic depressurization of the hot solution which is drawn off under pressure from the reaction loop causes the release of a certain amount of steam. The temperature of the solution falls and the concentration of the ammonium nitrate increases. In contrast to conventional practice, the solution which is collected in the separator 12 is immediately depressurized to a second pressure which is even lower than the first depressurization pressure and is introduced into an evaporator 13 which is heated by the steam 14 which is released during the first depressurization step. The condensates are removed through a conduit 14'.

The solution which is produced in the exchanger-evaporator 13 is then directed through a conduit 15' and by a pump 15 towards a second exchanger-evaporator 16 in which it is heated and concentrated by evaporation by means of the calories produced in the exchanger 3 by the recirculating solution, i.e. the fluid which circulates in the loop 17.

The concentrated solution which is recovered in the evaporator 16 has a concentration of 95% of ammonium nitrate.

The steam released by the solution in the evaporator 13 is removed through a conduit 18.

If the concentration of the acid is greater than 54%, the process may even become a steam exporting process.

The process according to the present invention comprises a first initial depressurization in the separator 12 and a second concentration in the evaporator 13 using the steam produced by the initial depressurization as the heating fluid.

It is obvious that in the evaporator 13, the temperature of the solution is lower than the condensation temperature of the steam released during the initial depressurization step.

The cooling which is observed during the second depressurization of the solution may involve the risk of crystallization in the evaporator 13.

In all the known processes, the solution which is obtained after the first depressurization is immediately reheated in an evaporator, either by the steam of the process (U.S. Pat. No. 2,551,569), or by the hot solution in the neutralisation reactor (GB-A 2,096,124), or by a heating fluid which transmits the neutralization heat (FR-A 1,356,054).

Unlike current practice, the present invention comprises carrying out a concentration by evaporation immediately after the first depressurization using the condensation heat of the steam released during this initial depressurization. In this way, a considerable amount of energy is saved.

The more dilute the initial hot solution, the greater the recovery of thermal energy.

The process according to the present invention makes it possible to reserve all the heat of the reaction which is recovered at a relatively high temperature level, in order to reheat the solution or solutions of ammonium nitrate in the region of the final concentration.

Table I demonstrates the saving of energy and the performances which are capable of being achieved for the concentration of different solutions of ammonium nitrate of initial decreasing concentrations by a depressurization followed by an autothermic evaporation.

Table I summarizes the results which are obtained in an installation which effects a double depressurization and comprises a laminar film evaporator, such as the one illustrated in FIG. 1. The temperature difference between the solution 15' and the condensate 14' amounts to about 4° C.

In each of the tests, the temperature of the solution 10 before depressurization is adjusted to 180° C.

In these tests, the pressure in the evaporator 13 was selected in a manner such that the crystallization temperature was not attained. The saving of energy results from the reuse of the condensation heat of the steam released during the first depressurization step.

Table I also gives the concentrations by weight of the ammonium nitrate solution and the quantities of water which are evaporated in a single depressurization operation according to the known processes when the solution is depressurized in a single stage in the separator 12 to a pressure which is identical to that which is imposed in the evaporator 13.

With a pressure of about 400 mbars, the temperature of the acid is automatically restricted to about 70° C.

In a different embodiment as illustrated in FIG. 2, the installation may comprise a reaction tank 2 with internal circulation.

In two other particular embodiments of the present invention shown in FIGS. 3 and 4, the reaction loop comprises a reactor 2, a container 5 having a constant level, a first exchanger-boiler 3 and a recirculation pump 4.

Nitric acid is introduced into the reactor 2 through a conduit 7, and gaseous ammonia is introduced through a conduit 8.

The pump 4 recycles the solution in the reactor through a conduit 19. In the reactor, the recycled solution is heated by the heat of reaction and the hot solution passes through the reservoir 5. The temperature and the concentration of the solution determine the vapour pressure of the solution in the reaction loop. The concentration of the solution depends on the concentration of nitric acid which is used. For a stable operating equilibrium, the heat drawn off from the recycling loop must exactly compensate for the heat generated by the reaction.

If the thermal energy which is available exceeds the thermal energy which is required to produce the concentrated solution, it is advantageous to install, as illustrated in FIGS. 3 and 4, an additional exchanger-boiler 20 which is supplied with boiler feed water to produce the low pressure steam. In the reservoir 5, the level is maintained constant by regulating a removal 10 of solution by an expansion valve 21. Most of the flow of solu-

TABLE I

Comparative study of the performances by the process according to the present invention and by a process involving a single depressurization.

| NH$_4$NO$_3$ solution before depressurization (180° C.) | Process according to the present invention | | | | Known process with single depressurization | | |
|---|---|---|---|---|---|---|---|
| | Depressurization pressure | | | | Depressurization pressure in the separator | NH$_4$NO$_3$ solution at the outlet of the separator | water evaporated in the separator |
| | Intermediate pressure | Final pressure | NH$_4$NO$_3$ solution | Evaporated water | | | |
| FIG. 1 denotes (10) % by weight | (14) bar abs. | (18) bar abs. | (15') % by weight | (14) + (18) kg of water per 1000 kg of NH$_4$NO$_3$ | bar abs. | % by weight | kg of water per 1000 kg of NH$_4$NO$_3$ |
| 70.2 | 0.7 | 0.2 | 85.6 | 256 | 0.2 | 78.7 | 154 |
| 65.6 | 0.6 | 0.15 | 83.3 | 324 | 0.15 | 74.3 | 180 |
| 61.8 | 0.4 | 0.125 | 81.0 | 383 | 0.125 | 71.4 | 267 |
| 56.0 | 0.25 | 0.085 | 77.5 | 495 | 0.085 | 66.1 | 273 |

Moreover, by carrying out a complete separation between the reaction zone and the evaporation loops, the process according to the present invention makes it possible to select the optimum degree of acidity for each operation. By this process, it is possible to maintain the slightly ammoniacal reaction mixture in the reaction loop and to neutralize the excess of ammonia by adding nitric acid in the evaporation loops.

Consequently, the risk of corrosion is reduced to a minimum in the reaction loop where an elevated temperature prevails, whereas the losses of ammonia and of vapours of nitric acid are reduced in the evaporators.

The present process ensures a high operational reliability, particularly because the maximum operating temperature which is restricted to 180° C. is sufficient in ensuring its heating autonomy.

The nitric acid may be preheated by the condensation of steam which is recovered under a reduced pressure.

tion passes through a conduit 22 towards the exchanger-boiler 3 where it is cooled.

In the reactor 2 which may be tubular, possibly with contact elements, or it may be of the static mixer type, the lower the recirculation rate, the greater the increase in temperature of the mixture.

The solution is drawn off through the expansion valve 21 towards the separator 12.

The steam which is released is removed through a conduit 14 towards a laminar film vertical exchanger 13 where it condenses outside the tubes under a reduced pressure regulated by a vacuum pump 28. The condensates which are recovered at the bottom of the tubes of the exchanger 13 are removed through a conduit 14' towards a cooler 24 and a barometric guard 25.

The ammonium nitrate solution which is drawn off from the separator 12 is guided through a conduit 26 and an expansion valve 27 towards the exchanger 13 where it flows in a laminar film on the internal wall of the tubes.

A reduced pressure is maintained by a vacuum pump 29 and the vapour released by the evaporation of the solution on the wall of the tubes is removed through a conduit 18 towards a cooler condenser 30, the condensates being removed by a barometric guard 31.

The reagents are preheated in the exchangers 32 and 33 which are supplied with steam at a low pressure of 0.3 bars. This low pressure steam is available in the conduits 34 of the reboiler 3.

In FIG. 3, the solution which is partially concentrated in the evaporator 13 is guided by a pump 15 towards the exchanger-boiler 3 which is heated by the solution recycled in the reaction loop. The boiling pressure is adjusted by an assembly of vacuum pump 35 and cooler 36 which is connected to the reboiler 3 by a conduit 34. The steam which is condensed in the cooler 36 is removed by a barometric guard 37. The solution which has reached its final concentration is recovered in a storage reservoir 38 and sent towards the user by a pump 38'.

If depressurization is to be carried out in three stages as shown in FIG. 4, the solution which is partially concentrated in the evaporator 13 is guided by a pump 15 through a conduit 15' towards an exchanger boiler 39 which is heated by the solution circulating in the reaction loop 1 through a conduit 40. In the reboiler 39, the solution is brought to boiling point and the steam which is generated is sent through a conduit 41 towards the heating coil of an exchanger-boiler 42 where it condenses, the condensates being removed through a purifier 41'. The solution which has been brought to boiling point under pressure in the boiler 39 passes through a conduit 43 and an expansion valve 43' towards the boiler which operates under a reduced pressure which is regulated by the assembly of vacuum pump 44, cooler 45 and barometic guard 45'.

After being concentrated by boiling in the boiler 42 to the extent of the condensation heat which is released in the heating coil, the solution is drawn up by suction by a pump 46 through a conduit 47 and sent to the last concentration stage in the exchanger-boiler 3.

The operating conditions relating to the operation of an installation, such as the one illustrated in FIG. 4 are summarised in Table II.

Thus, the process according to the present invention makes it possible to obtain a final solution of ammonium nitrate of a concentration greater than 95% from a 54% nitric acid, without an external supply of heat.

TABLE II

This Example which is expressed in numbers illustrates the production of a 98% by weight ammonium nitrate solution from 54% by weight nitric acid and gaseous ammonia in an installation similar to the one shown in FIG. 4.

|  | Reference numerals of FIG. 4 | Flow rate (T/h) | Concentration % | Temperature °C. |
|---|---|---|---|---|
| Supply of reactor 2 | 2 | — | | |
| with 54% by weight nitric acid at 65° C. | 7 | 36.46 | 54 | 65 |
| with ammonia | 8 | 5.31 | 100 | 65 |
| $NH_4NO_3$ solution at inlet of reactor 2 | 19 | 299.52 | 59.86 | 155 |
| $NH_4NO_3$ solution at outlet of reactor | 5 | 341.29 | 59.86 | 180 |
| Recycling of solution towards 3, 4, 20 and 39. | 22 | 299.52 | 59.86 | 180 |
| Removal of solution towards 1st depressurization | 10 | 41.77 | 59.86 | 180 |
| Outlet of evaporator 13 (0.2 bar) | 15' | 32.5 | 76.9 | 78 |
| Outlet of reboiler 39 (2.2 bar) | 43 | 30.3 | 82.6 | 162 |
| Outlet of reboiler 42 (0.3 bar) | 47 | 26.6 | 94.1 | 121 |
| Outlet of reboiler 3 (0.3 bar) | 38 | 25.5 | 98.0 | 165 |
| | | GJ/hour | | |
| Energy supplied to reboiler 3 | | 4.75 | | |
| to reboiler 39 | | 10.47 | | |
| to recuperator 20 | | 5.68 | | |

It is obvious that the present invention is not restricted to the specific installations described above, and that numerous modifications may be made to the above-described embodiments, without thereby departing from the scope of the invention.

Thus, if the pressure of reboiler 42 is adjusted to be greater than the pressure which prevails in the conduit 14, it is possible reuse at least some of the steam generated in the reboiler 42 to heat the evaporator 13.

We claim:

1. A process for the production of ammonium nitrate by the neutralization reaction of nitric acid with ammonia, comprising the steps of:

introducing ammonia and nitric acid to a reaction zone to produce an ammonium nitrate solution by the neutralization reaction thereof, the pressure in said reaction zone being greater than the vapor pressure of the ammonium nitrate solution;

withdrawing and recycling a portion of said ammonium nitrate solution to said reaction zone;

withdrawing the remaining portion of said ammonium nitrate solution from said reaction zone and introducing said portion into a separator to effect a first depressurization step such that steam is released from said portion and said portion is concentrated;

withdrawing and subjecting said portion to a second depressurization step;

introducing said portion into a multistage evaporator means having a first evaporator means and at least one additional evaporator means to concentrate said portion;

introducing the steam produced from the first depressurization step into said first evaporator means to provide heat therein;

utilizing a portion of the heat generated by the neutralization reaction to heat the final evaporator means of the multistage evaporator means; and withdrawing a final product solution of ammonium nitrate from said final evaporator means.

2. A process according to claim 1, wherein said first depressurization step is adiabatic.

3. A process according to claim 1, wherein said ammonia introduced into said reaction zone is gaseous or aqueous ammonia solution.

4. A process according to claim 1, in which neutralization takes place in said reaction zone under an absolute pressure of from 3 to 10 bars.

5. A process according to claim 1, in which at least some of the recycled solution is used as a heating fluid to heat said evaporator which brings said solution to its final concentration.

6. A process according to claim 1, in which said neutralization reaction is carried out in the presence of a slight excess of ammonia which is then neutralized by a complement of nitric acid in the portion which is withdrawn from the reaction zone just before said first depressurization step.

7. A process according to claim 1, in which the heat of reaction of said neutralization is stored in the solution in the reaction zone under the form of an increase of temperature of the solution controlled by means of indirect heat exchangers at the highest possible temperature level corresponding to an absolute pressure of from 3 to 10 bars where at least part of the available heat is supplied to a stepwise flash evaporation for concentrating the hot solution product.

8. A process according to claim 1, in which the recycle rate is adjusted which limits the increase in temperature in said reaction zone.

9. A process according to claim 1, in which gaseous ammonia and nitric acid after preheating to 65° C. are injected in a closed high recycle reaction loop of ammonium nitrate solution which is pumped through a series of heat exchangers, the first of which is a final evaporator in which the highest concentration of ammonium nitrate is achieved and the other exchangers in the loop are a falling film evaporator for supplying the preconcentration of the solution and a steam kettle in which clean 5 bar steam is produced, and the net production make-up, removed from the circulation loop through a pressure reducing valve, is submitted to an adiabatic expansion after which further concentration is achieved in said falling-film exchangers where condensation of the flashed vapors supplies the evaporation heat demand.

* * * * *